UNITED STATES PATENT OFFICE.

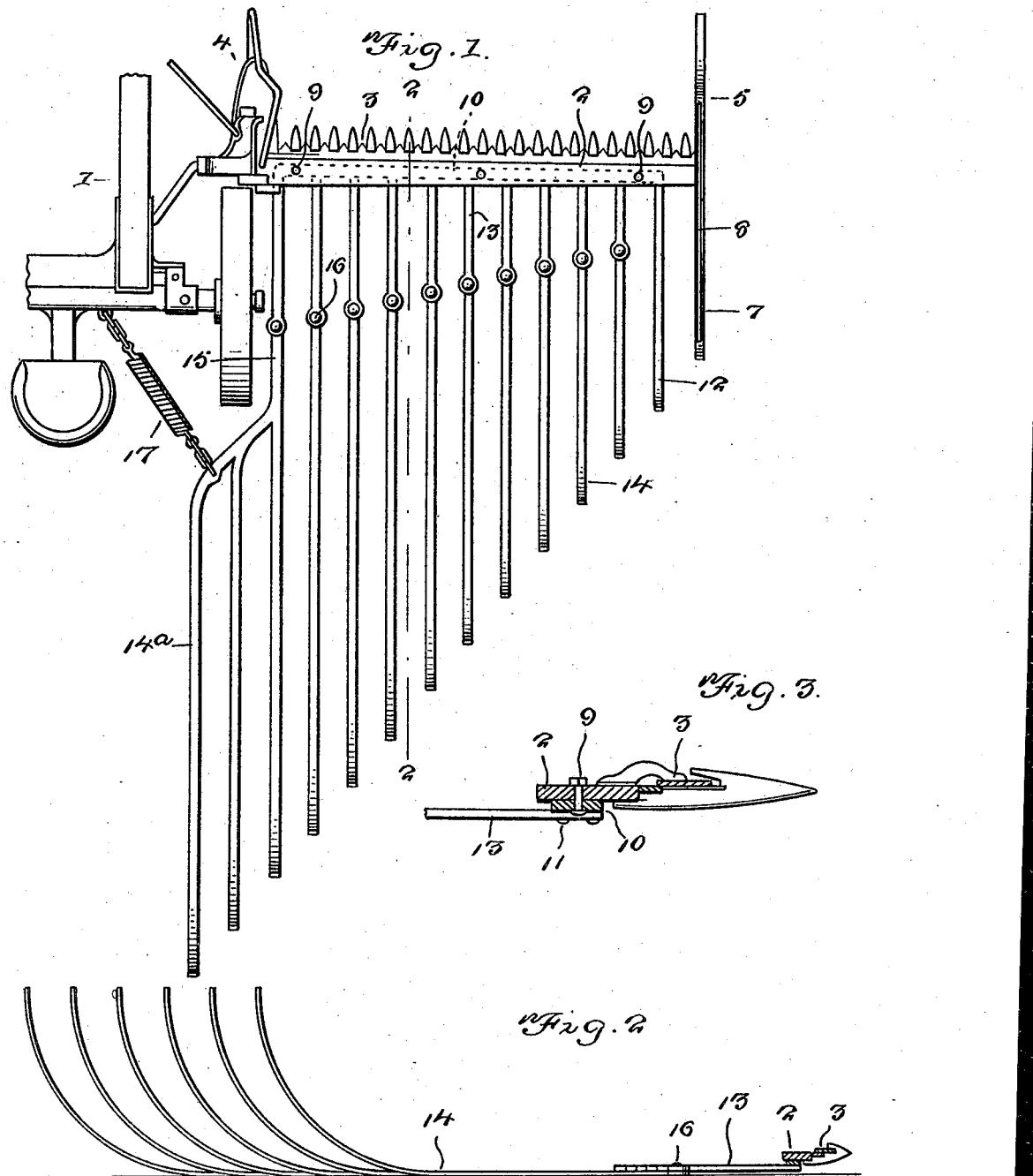

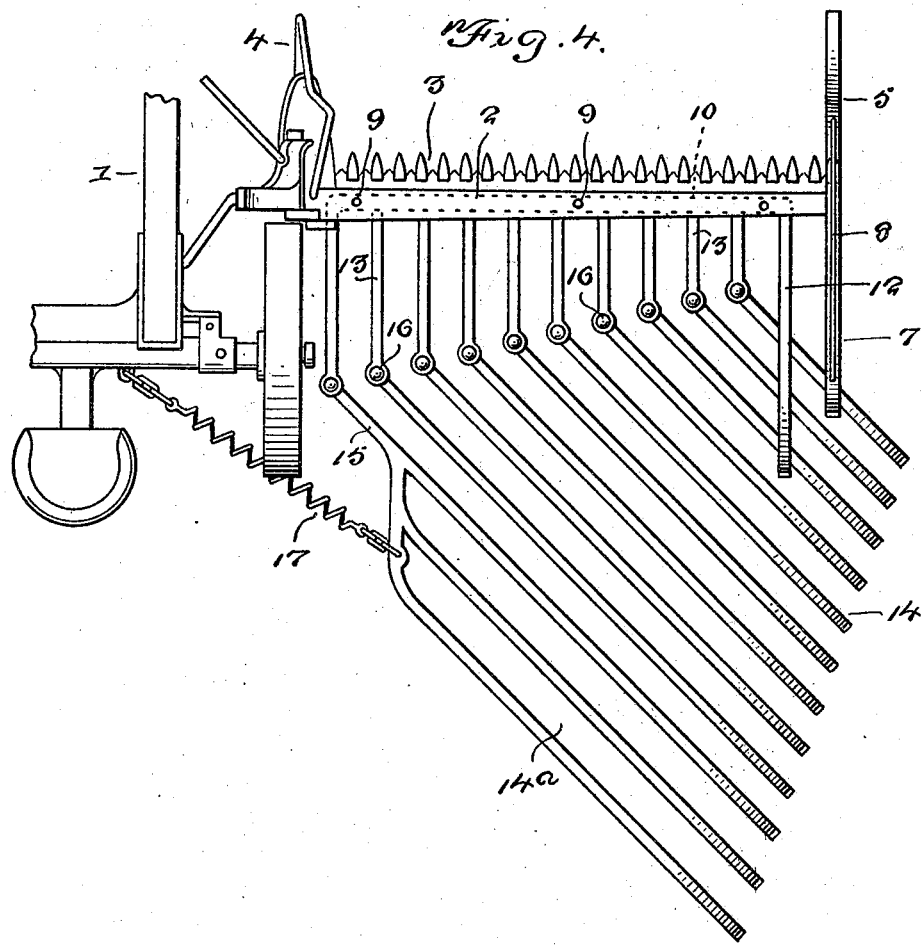

JOHN R. HINTON, OF HANSEN, IDAHO.

SWATHER FOR MOWING MACHINES.

1,419,051.  Specification of Letters Patent.  Patented June 6, 1922.

Application filed December 11, 1920. Serial No. 429,954.

*To all whom it may concern:*

Be it known that I, JOHN R. HINTON, a citizen of the United States, residing at Hansen, in the county of Twin Falls and State of Idaho, have invented new and useful Improvements in Swathers for Mowing Machines, of which the following is a specification.

The object of my present invention is the provision of a swather for mowing machines, characterized by flexibility and consequent capacity to swing freely to the right or left so as to follow turns and curves and operate efficiently in all positions, and one adapted to adequately segregate a swath from standing grass, and in which no obstruction whatever is offered to the rearward passage of a swath.

To the attainment of the foregoing, the invention consists in the improvement as hereinafter described and definitely claimed.

In the accompanying drawings, forming part hereof:—

Figure 1 is a plan view illustrative of the application of my novel swather to a mowing machine.

Figure 2 is a vertical section taken in the plane indicated by the line 2—2 of Figure 1.

Figure 3 is an enlarged detail section illustrative of the rigid connection of the forward members of certain of the tines to the carrying bar of the mower cutting mechanism.

Figure 4 is a plan view showing the rear members of certain of the tines as they appear when swung toward the right.

Figure 5 is an enlarged side elevation illustrating the division means constructed in accordance with my invention.

Similar numerals of reference designate corresponding parts in all of the views of the drawings.

In general the mowing machine 1 may be and preferably is of the ordinary well known construction, and among other elements it comprises a carrying bar 2, for the cutting mechanism designated by 3. At the inner end of the cutting mechanism the mower is provided with a forwardly projecting fender 4 which may be and preferably is of the ordinary well known construction. At the outer end of the carrying bar 2 is arranged my novel division means—i. e., the means to divide or segregate the swath from standing grass. The said division means is best illustrated in Figure 5, and by reference to said figure it will be understood as comprising a runner 5, an upright 6 fixed to the rear portion of said runner, a tine 7 fixed to the rear portion of the runner 5 and extending rearwardly therefrom and then upwardly, and a longitudinal bar 8, the latter fixed at its forward end to the runner 5 and at an intermediate point of its length to the upright 6 and having its rear end portion arranged in close proximity to, though spaced from, the rear portion of the tine 7. The runner 5 is carried upwardly and forwardly in the form of a compound curve, and it is adapted to ride over the grass and start the roll to the cutting mechanism 3. In this connection it will be observed that the division means is fixed at right angles to the length of the cutting mechanism, and that it is at once light in weight and well adapted to withstand the usage to which division devices are ordinarily subjected. Strongly fixed at 9 to the carrying bar 2 is a bar 10 which is disposed under the carrying bar 2 for an important purpose hereinafter set forth.

Arranged under and fixed to the bar 10, as indicated by 11 is the outermost tine 12 of the series. The said tine 12 is rigidly maintained in spaced relation to the division means in Figure 5 as will be readily understood by comparison of Figures 1, 3 and 4.

Spaced apart and arranged in parallel relation to the tine 12 and to each other are the rigid members 13 of the other tines. The said rigid members 13 are gradually increased in length as they recede from the tine 12, Figures 1, and 4. It will also be observed that the forward portions of the tine members 13 are arranged under and are fixed to the before mentioned bar 10. At this point I would have it understood that the rigid connection of the tine 12 and the tine members 13 to the bar 10, and the fixture of the bar 10 to the underside of the carrying bar 2 is materially advantageous inasmuch as it assures the free rearward passage of the swath from the cutting mechanism to the tines and rearwardly over the tines. Certain of the tines are formed by rear members 14 in combination with forward members 13, and in combination with the innermost member 13 is employed a shank 15 by which three members 14ᵃ are carried. The tine members 14 and 14ᵃ are gradually increased in length inwardly, and the rear portions of all of the tines are curved upwardly after the manner illustrated in Figure 2. The rear tine members 14 and the shank 15 are hingedly connected at 16 to the forward tine members 13 so as to permit the said members 14 and shank 15 to freely swing in horizontal plane in either direction. From this it follows that the swather is possessed of great flexibility and is adapted to lend itself to turns or curves incident to the traverse of the mowing machine with the result that the swather is highly efficient in operation irrespective of the position of the mowing machine. Interposed between the group of tine members 14$^a$ and the frame of the mowing machine is a retractile spring 17 which is preferably, though not necessarily, employed to assist in the return of the tine members 14$^a$ from the positions shown in Figure 4 to the positions shown in Figure 1.

By virtue of the construction of my improvement it will be observed that the division means best shown in Figure 5 will ride up on and divide the swath from the standing grass, and subsequently to the cutting, the swath will be guided freely over the tines and rolled and deposited in a windrow in rear of the tines.

It will be manifest that the tine members 13 being rigidly fastened cannot swing or turn in any direction. The hinge joints 16 between the members 13 and the tine members 14 and 14$^a$ serve to keep the tines in their horizontal position. It will also be observed that while the hinge joints serve the purpose stated, they also permit the rearward passage of a swath. By particular reference to Figure 3 it will be observed that the stubble is cut a slight distance, about three quarter of an inch, above the tops of the tine members 13. As soon as the cutting bar passes over, the stubble immediately flies up above the cutter bar and alongside the tine members 13 and 14 and 14$^a$, and holds the mown hay, allowing the tines to slide under the swath until the curved portions of the tine members 14 and 14$^a$ begin the roll. The weight of the roll holds the tine members 14 and 14$^a$ down in the stubble, and said members 14 and 14$^a$ necessarily trail behind the members 13 and rest in parallelism with each other.

In Figure 4 the trailing tine members which approach a corner, are resting in the stubble and in parallel positions. As the mower swings toward the right carrying the rigid tine members 13 to the new position with the cutter bar ready to cut past the corner the tine members 14 and 14$^a$ are left in the last-named positions. The said tine members 14 and 14$^a$ are held parallel at all times by the stubble while the mower is cutting. Of course in turning the corners there is some slight variation from the parallel positions but the increasing length of the rigid tine members 13 enable the curved portions of the members 14 and 14$^a$ to pass each other in right angle turning, and the said members 14 and 14$^a$ are adapted to promptly return to the normal trailing position. The spring 17 serves merely to assist the members 14$^a$ to return to the trailing position shown in Figure 1. This will be better understood when it is stated that in turning a corner with a heavy swath on the tine members 14 and 14$^a$, the shorter tine members are first pulled away from the swath while the longer tine members are still in engagement with the swath. It is to assist the assembly of the tine members 14$^a$ that the spring 17 is employed. It will further be understood that as the mower moves forwardly a few feet the stubble will force all of the trailing tine members to normal trailing position shown in Figure 1, and the spring 17 will then be idle until a turn is made.

It will also be apparent from the foregoing that notwithstanding the practical efficiency of my novel swather the same is simple and inexpensive in construction, is light in weight, and is free from delicate parts such as are likely to get out of order after a short period of use.

Having described my invention, what I claim and desire to secure by Letters-Patent, is:—

1. In a swather for mowing machines, a plurality of side by side spaced tines each of which is made up of a forward rigid member and a rear member hingedly connected to the forward member, and adapted to freely swing toward the right or left.

2. In a swather for mowing machines, a plurality of side by side spaced tines each of which is made up of a forward rigid member and a rear member hingedly connected to the forward member, and adapted to freely swing toward the right or left; the forward members of the tines and the rear members thereof being gradually increased in lengths inwardly, and the rear portions of the tines being deflected upwardly.

3. In a swather for mowing machines, a plurality of side by side spaced tines each of which is made up of a forward rigid member and a rear member hingedly connected to the forward member, and adapted to freely swing toward the right or left, in combination with a bar to which the forward portions of the forward members are rigidly connected, and an outer rigid tine fixed to and extending rearwardly from the said bar and spaced outwardly beyond the outermost flexible tine.

4. In a swather for mowing machines, a plurality of side by side spaced tines each of which is made up of a forward rigid member and a rear member hingedly connected to the forward member, and adapted to freely swing toward the rigth or left, in combination with a bar to which the forward portions of the forward members are rigidly connected, an outer rigid tine fixed to and extending rearwardly from the said bar and spaced outwardly beyond the outermost flexible tine, and division means carried by and extending forwardly, upwardly and rearwardly from the said bar and spaced outwardly beyond the rigid tine.

5. In a swather for mowing machines, a plurality of side by side spaced tines each of which is made up of a forward rigid member and a rear member hingedly connected to the forward member, and adapted to freely swing toward the right or left, in combination with a bar to which the forward portions of the forward members are rigidly connected, an outer rigid tine fixed to and extending rearwardly from the said bar and spaced outwardly beyond the outermost flexible tine, and division means carried by and extending forwardly, upwardly and rearwardly from the said bar and spaced outwardly beyond the rigid tine; the said bar being adapted to be arranged under and fixedly connected to the carrying bar of a mower cutting mechanism, whereby no obstruction will be afforded to the rearward passage of a swath received on the tines.

6. The combination with the cutting mechanism and the carrying bar thereof, of division means at the outer end of and disposed at right angles to the carrying bar, a bar arranged at the underside of and fixed to said carrying bar and fixedly connected to said division means, a rigid outer tine fixed to the underside of and extending rearwardly from the second-named bar in parallelism to the division means, forward tine members fixed to the underside of and extending rearwardly from the second-named bar and arranged in spaced relation and gradually increased in length inwardly, tine members hingedly connected at their forward ends to the rear ends of all of the forward tine members save the innermost forward tine member and gradually increased in length inwardly and having their rear portions deflected upwardly, a shank hingedly connected to the rear end of the innermost forward tine member and carrying a plurality of tines gradually increased in length inwardly and having their rear portions deflected upwardly, and a retractile spring connected with the said shank to assist in the return of the said plurality of tines on the shank to their normal trailing positions.

In testimony whereof I affix my signature.

JOHN R. HINTON.